United States Patent
Wilson (10) Patent No.: US 7,568,006 B2
(45) Date of Patent: Jul. 28, 2009

(54) E-BUSINESS ON-DEMAND FOR DESIGN AUTOMATION TOOLS

(75) Inventor: Brian Christopher Wilson, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 11/000,438

(22) Filed: Nov. 30, 2004

(65) Prior Publication Data
US 2006/0117064 A1   Jun. 1, 2006

(51) Int. Cl.
  G06F 15/16   (2006.01)
  G06F 15/173  (2006.01)
  G06F 17/50   (2006.01)
  G06F 9/44    (2006.01)

(52) U.S. Cl. .............. 709/205; 716/4; 716/5; 716/6; 709/204; 709/218; 709/225; 717/102; 717/115

(58) Field of Classification Search ........... 709/203, 709/204, 205, 217, 218, 224, 225, 235, 229; 717/100, 104, 124, 126, 134, 135, 115, 102; 716/4–6; 703/19
See application file for complete search history.

(56) References Cited

U.S. PATENT DOCUMENTS

| | | | |
|---|---|---|---|
| 6,519,568 B1 | 2/2003 | Harvey et al. | |
| 6,643,683 B1 * | 11/2003 | Drumm et al. | ............... 709/203 |
| 7,080,120 B2 * | 7/2006 | Betros et al. | ................. 709/205 |
| 2003/0079121 A1 | 4/2003 | Gilman et al. | |
| 2004/0098447 A1 * | 5/2004 | Verbeke et al. | ............... 709/201 |
| 2004/0193679 A1 | 9/2004 | Tecco et al. | |
| 2005/0015439 A1 * | 1/2005 | Balaji et al. | ................. 709/203 |
| 2005/0078822 A1 | 4/2005 | Shavit et al. | |

OTHER PUBLICATIONS

U.S. Appl. No. 10/835,454, entitled "Computer Grid Access Management System" filed Apr. 29, 2004 by William A. Oswald et al.

* cited by examiner

*Primary Examiner*—Ario Etienne
*Assistant Examiner*—Gregory G Todd
(74) *Attorney, Agent, or Firm*—Patterson & Sheridan, LLP (57) ABSTRACT

Methods, apparatus and articles of manufacture are disclosed for a design automation application to evaluate a design automation task using an on-demand computer network. A requesting entity transmits the design automation task, along with a set of data used for testing, to a drop server box provided by the on-demand computer network. The design automation application is configured to process the design automation task and to prevent it from interfering with, or eavesdropping on, other tasks being executed in the on-demand environment and from interfering with the operation of the on-demand environment itself. The design automation application consumes available grid resources to complete the processing task.

11 Claims, 6 Drawing Sheets

E-BUSINESS ON-DEMAND FOR DESIGN AUTOMATION TOOLS

CROSS-REFERENCE TO RELATED APPLICATIONS

This application is related to a commonly owned, currently pending U.S. application, entitled "Computer Grid Access Management System," Ser. No. 10/835,454, filed Apr. 29, 2004, which is incorporated herein by reference in its entirety.

BACKGROUND OF THE INVENTION

1. Field of the Invention

The present invention generally relates to networked computer systems, and more particularly, to methods and systems for executing individual design automation tasks without interference from other similar tasks being executed on the same computer or network of computers.

2. Description of the Related Art

An on-demand environment can be described as one or more discrete computers, each possessing one or more processing units (e.g., CPUs) joined together to from a computer network. The on-demand aspect is embodied by management software that receives processing requests and then applies the most appropriate resources to processing requests when available. In addition, the management software may change the resources allocated to a running process, to both increase and decrease the resources allocated to a running process, depending on a variety of factors. One embodiment of a management software product is IBM's Load Leveler® application. The management software is aware of the resources that are currently being used to satisfy processing requests as well as the resources that remain available, and is further configured to detect when computing resources are added to or removed from the on-demand environment.

The on-demand environment (also referred to as a computing grid) includes an arbitrary number of, possibly heterogeneous, computer systems. Large computing grids are capable of harnessing tremendous computing power. It has become useful for the owners of such large computing grids to accept job processing requests from unrelated entities. For example, design automation tasks such as high-level synthesis, logic synthesis, static timing analysis, placement, and physical synthesis (among others) are strong candidates for an on-demand, grid-based solution. Typically, these tasks may be characterized as being long running processes that can take multiple hours or even days to complete, and often require very large amounts of computational resources. Additionally, because the tasks require a limited amount of data and execution logic, the tasks may be transmitted over a network in a reasonable time. Because the constraining aspect is processing time, the more computational "horsepower" available to process a design automation task, the faster a job may be completed. Accordingly, maximizing the utilization of computing resources is an important goal for an on-demand grid services provider.

A grid services provider may process design automation tasks on a first come first served basis or on a reservation basis. Problems arise, however, when processing requests from different entities are allowed access to the same computing grid. First, security concerns arise where the processing request from one entity might be allowed to snoop on the activity of other tasks being processed by the computing grid or on the grid itself. Second, aside from these security concerns, design automation tasks may be very complex, and if not properly constructed, may operate incorrectly, interfering with other processes or "crashing" portions of the grid.

One common solution to this problem is to partition grid resources to a task in advance. When a new task arrives at the grid (e.g., is transmitted over a network to a "drop box" server), an estimate of resources required to complete the task is made, and a subset of grid resources may be partitioned to the new task, giving the task its own closed environment in which to execute. Doing so segregates tasks from one another, thereby preventing one task from eavesdropping on another. Further, an errant task is prevented from disrupting no more than the grid resources allocated to it due to a "crash" or other exception event.

This approach, however, may leave grid resources unused, even when available. For example, consider a grid with 32 memory units available to store data. If one process is partitioned 18 units, but only uses 12, then a second task requiring 16 units will have to wait until the first process completed, despite that collectively, only 28 units are required to complete both tasks simultaneously. Also, once a job completes, the resources partitioned to it may have to be "scrubbed." For example, hard drives may have to be erased, and operating systems re-installed to ensure that one task did not bring in (or itself comprise) a "Trojan horse" that may either eavesdrop on subsequent activity or damage grid resources. Doing so, however, takes time and reduces the resources that are available to other tasks, which may itself cause other tasks to take longer to complete, further reducing the utilization of a computing grid.

Another approach is for the grid provider to also provide a number of pre-defined tasks that may be carried out by the computing grid. This way, parties only need to submit data components to the grid provider. This approach, however, prevents entities from developing their own design automation programs. Thus, a grid provider may not be able to provide all the services needed for a particular entity. Further, it may prevent one party from employing requisite proprietary processing techniques.

Accordingly, there remains a need for a grid services provider to maximize the availability of a computing grid while simultaneously protecting the security of unrelated processing tasks. In particular, concurrently executing design automation tasks should execute without interference from others, and conversely, should be prevented from accessing or eavesdropping on others. Additionally, the computing grid itself should be protected from intentional or unintentional harm that may be caused by processing a design automation task.

SUMMARY OF THE INVENTION

The present invention generally provides methods, systems and articles of manufacture for providing grid computing services to multiple entities. One embodiment of the present invention provides a command interpreter configured to execute a design automation task in a grid environment. The command interpreter is configured to provide developers with the flexibility to construct design automation tasks while simultaneously preventing such tasks from engaging in improper activity. The command interpreter executes each submitted design automation task using a dynamic, secure container. This allows resources allocated to a particular request to change (i) as resources are required by the process as it executes, (ii) as resources are available, and also (iii) according to predefined limits (e.g., the maximum amount of resources contracted for). At the same time, however, the design automation task supplied to the computing grid is prohibited from accessing commands (or engaging in operations) that would allow one process to eavesdrop or interfere with others, or with the grid itself.

One embodiment of the invention provides a method for accessing a computing grid. The method generally includes providing a design automation application, wherein the design automation application is configured to process a design automation task, wherein the design automation task comprises (i) a set of commands to be evaluated by the design automation application, and (ii) a set of data representing an electronic circuit; and providing an interface for a user of a computer system to transmit the design automation task to the computing grid.

Another embodiment of the invention provides a system for evaluating a design automation task. The system generally includes a computing grid, wherein the computing grid comprises a plurality of computer resources connected together to form a network of resources, and a design automation application configured to process the design automation task using the network of resources, wherein the design automation task comprises (i) a set of commands to be processed by the design automation application and (ii) a set of data representing an electronic circuit, and wherein the design automation task is configured to process the processing request using the network of resources. The system generally further includes a grid manager configured to (i) monitor the resources available in the computing grid, (ii) assign to resources from the computing grid to process the design automation task, and (iii) to receive and store results generated by processing the design automation task submitted by a requesting entity Another embodiment of the invention provides a computer readable medium that includes instructions, which when executed by a computer system, perform operations. The operations generally include defining a design automation package, wherein the design automation application is configured to process a design automation task, wherein the design automation package comprises (i) a set of commands to be processed by the design automation application and (ii) a set of data representing an electronic circuit, and providing an interface for a requesting entity to transmit the design automation package to a computing grid. The operations generally may further include receiving, from the requesting entity, the design automation task and a request to process the design automation task, invoking an instance of the design automation application on the computing grid, providing the design automation package to the instance of the design automation application, evaluating the set of commands included in the design automation package, and returning an indication of the results of the evaluation to the requesting entity.

Another embodiment of the invention provides a computer readable medium that includes information stored thereon. The information generally includes a design automation application configured to process a design automation task, wherein the design automation task comprises (i) a set of commands to be processed by the design automation application and (ii) a set of data representing an electronic circuit. The information generally may further include a grid manager configured to (i) monitor the resources available in the computing grid, (ii) assign to resources available on the computing grid to process the design automation task, and (iii) to receive and store results generated by processing the design automation task submitted by a requesting entity.

BRIEF DESCRIPTION OF THE DRAWINGS

So that the manner in which the above recited features, advantages and objects of the present invention are attained and may be understood in detail, a more particular description of the invention, briefly summarized above, may be had by reference to the embodiments thereof which are illustrated in the appended drawings. Note, however, that the appended drawings illustrate only typical embodiments of this invention and are, therefore, not to be considered limiting of its scope, for the invention may admit to other equally effective embodiments.

DETAILED DESCRIPTION OF THE PREFERRED EMBODIMENTS

The present invention generally pertains to on-demand access to computerized resources. Computerized resources are made available in response to the actual needs generated by a processing request, rather than projected needs. Embodiments of the invention provide a computing environment wherein multiple processing requests may be executed simultaneously without interference from (or causing interference to) other tasks. Processing requests consume only the capacity and resources they need, when the capacity and resources are needed, and in one embodiment, are charged accordingly. As a result, the cost of computerized resources substantially matches the computerized resources actually used. Further, because resources are not partitioned to a particular task in advance, resource utilization is increased, and the downtime associated with manually partitioning resources between tasks is substantially reduced, if not eliminated entirely.

The following description references embodiments of the invention. It should be understood, however, that the invention is not limited to any specific described embodiment. Instead, any combination of the following features and elements, whether related to described embodiments or not, is contemplated to implement and practice the invention. Furthermore, in various embodiments, the invention provides numerous advantages over the prior art. Although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a particular claim.

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks, within a diskette drive, or a hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified or implied by such nomenclature.

As described above, an on-demand environment may comprise a collection of, possibly heterogeneous, computing systems connected together to form a network. In one embodiment, a grid entity may itself comprise a networked computing system such as a computing cluster. For example, a Beowulf cluster is a well known system design for connecting a set of inexpensive personal computer systems together so that they appear as a single multi-processor computer system. Embodiments of the invention manage networks of multiple computer systems that all have distinct identities. Within that environment a single entity may comprise a Beowulf cluster.

The independent systems managed by the grid network are each available to be assigned particular tasks. Generally, the computing systems included in the on-demand environment are available to perform tasks assigned by a grid manager. In one embodiment, the grid manager may comprise IBM's Load Leveler® software application.

The grid management system is responsible for assigning grid consumable resources to processing tasks. Consumable resources are assets available on machines in a computing grid. They are called "resources" because they model the commodities or services available on machines (e.g., CPUs, real memory, virtual memory, software licenses, and disk space, or, with less granularity, entire systems). They are considered "consumable" because job steps for a particular running task may use specified amounts of these commodities when the step is running. Once the step finishes, the resource becomes available for another job step or other task.

In one embodiment, a computing grid may be used to process design automation tasks including high-level synthesis, logic synthesis, static timing analysis, placement, physical synthesis, or wiring. Generally, an entity wishing to submit one of these tasks for processing assembles the necessary client data and controls (collectively, a processing task or request) and transmits the request to the computing grid, typically using a secure connection (e.g., SSL/TLS, S/MIMIE, HTTPS, or other protocol used to encrypt and transfer data across an insecure communications medium).

Once received by the computing gird, newly submitted tasks may be retrieved from a drop-box server and scheduled for execution on the gird by a secure design automation application. As described further below, the client data and controls submitted with a task may be used as input to the secure design automation application. Using grid resources, the application executes the user supplied controls in a manner that prevents client controls from executing malicious code or gathering unauthorized information. The client controls define the operations, calculations, and the like on the data. Grid security may be provided at the application level, and accordingly, the grid does not require that consumable resources to be partitioned among concurrent discrete tasks. Once processing is complete, the results may be stored in the drop-box server or may be returned to the requesting entity via a secure connection.

Figure 1:
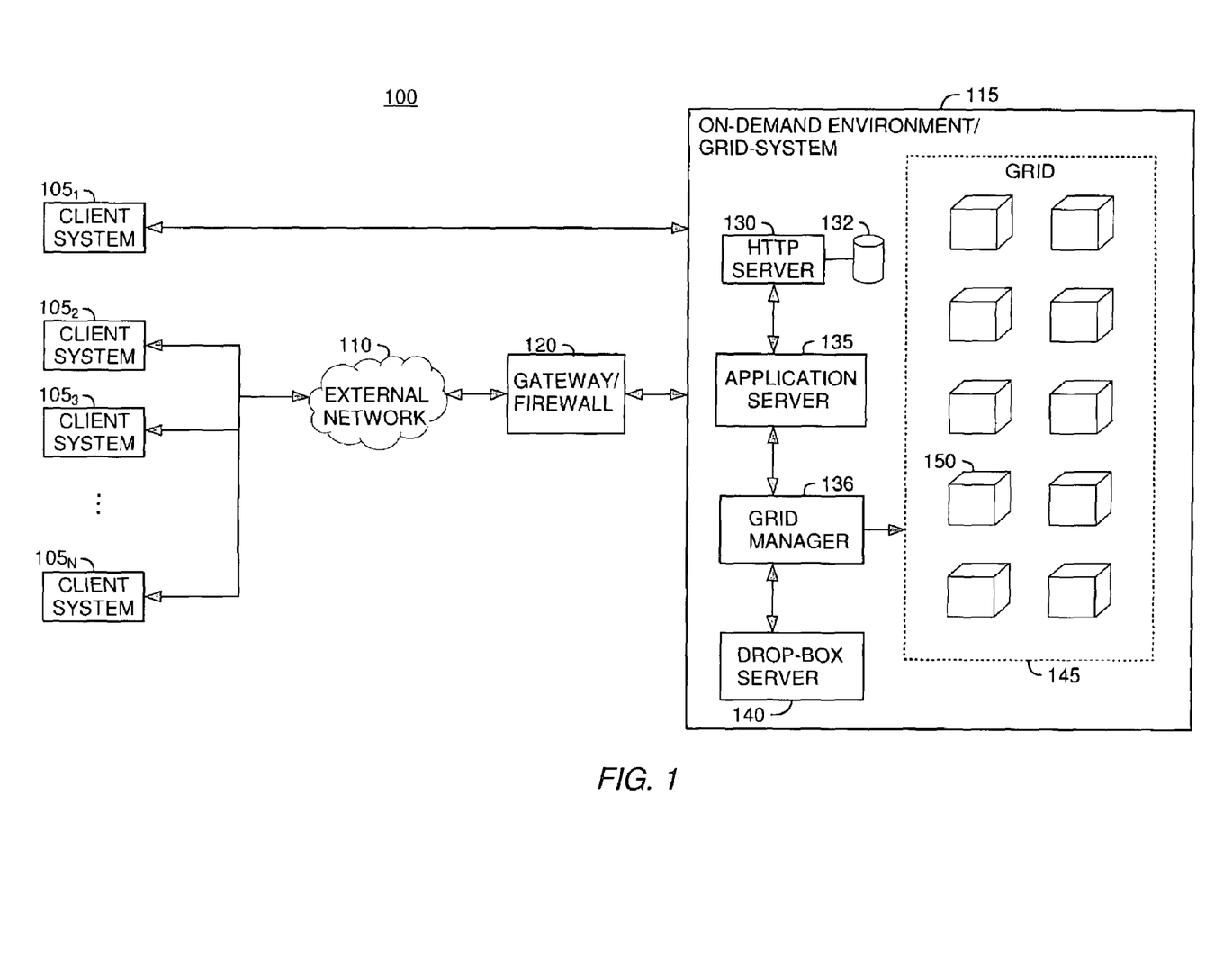
FIG. 1 illustrates a system for managing on-demand access to automated design tools according to one embodiment of the invention.

FIG. 1 illustrates an on-demand environment 100 that includes grid based computer system (also referred to herein as the "grid system") 115 configured to receive processing requests from multiple entities (e.g., client systems $105_{1-N}$). In one embodiment, the grid computing system is made available to perform design automation tasks. Each of the client systems $105_{1-N}$ are configured to communicate with the grid system 115 using well known and commonly available protocols (e.g., TCP/IP). For example, external client systems $105_2$ and $105_N$ communicate with the grid system using external network 110. In one embodiment, external network 110 may comprise the Internet. Alternatively, the client system (e.g., client system $105_1$) may reside on the same network as the grid system 115.

The grid system 115 illustrates components included in the on-demand environment, according to one embodiment of the invention. All remote communication to and from the grid system 115 may occur through gateway/firewall 120. As those skilled in the art understand, a gateway may be used to route incoming communications from an external network to a destination inside the on-demand environment 115. As illustrated, all communication are also processed using gateway/firewall 120 that may be used to monitor network traffic (e.g., data packets) and determine which ones may be forwarded to computer systems or processes behind the gateway/firewall 120.

In one embodiment, a HTTP server 130 may be configured to provide client systems $105_{1-N}$ a web-based interface to submit processing requests (and retrieve results) from grid system 115. Accordingly, HTTP server 130 may store a set of relatively static HTML documents to display an interface to a client 105 and to transfer data between them (e.g., using GET and POST methods) and grid system 115. Application server 135 may allow clients to access applications and databases that are managed by the server 135. The application server 135 handles all the application operations and connections for the clients 105. In one embodiment, grid system 115 may include drop box server 140 that is configured to store processing requests submitted by clients 105 along with results generated from a processing request for retrieval by a client 105. Detailed descriptions of access management techniques and the drop box server are described in commonly owned, pending application entitled "Computer Grid Access Management System".

The computing grid 145 includes a plurality of grid elements 150. The grid elements 150 collectively represent the computational resources available for allocation to various tasks. It should be noted that each of the grid elements of FIG. 1 need not be representative of the same type of resource or resource granularity. For example, one of the grid elements may be representative of a computer system, while another grid element may be representative of disk space, and another a group of clustered systems treated as a single entity. Even where two or more grid elements represent the same resource, e.g., disk space or memory, the elements may be representative of different amounts of the resource, e.g., 20 GB, 40 GB, etc.

The grid system 115 may also include a grid manager 136. The grid manager 136 dispatches the processing requests initiated by the Application Server 135 to the computing grid 145, the grid resources that are currently consumed and available (i.e., grid elements 150), and also manages the state of the computing grid 145 (e.g., as computer systems are added or removed from the computing grid). As illustrated in FIG. 1, the computing grid 145 may be composed from an arbitrary number of grid elements 150. Each grid element 150 may itself comprise a separate computer system with its own corresponding memory, processor, storage space, operating system, and application software, or may comprise resource elements available in a system of computer systems linked in a cluster configuration.

Although components of the grid system 115 are illustrated in FIG. 1 as independent elements, those skilled in the art will recognize that embodiments of the invention may implement many different configurations of computer systems and processes to provide on-demand environment/grid system 115. For example, HTTP server 130 and drop box server 140 may comprise processes running on the same physical computer system, without changing the functionally described above.

Figure 2A:
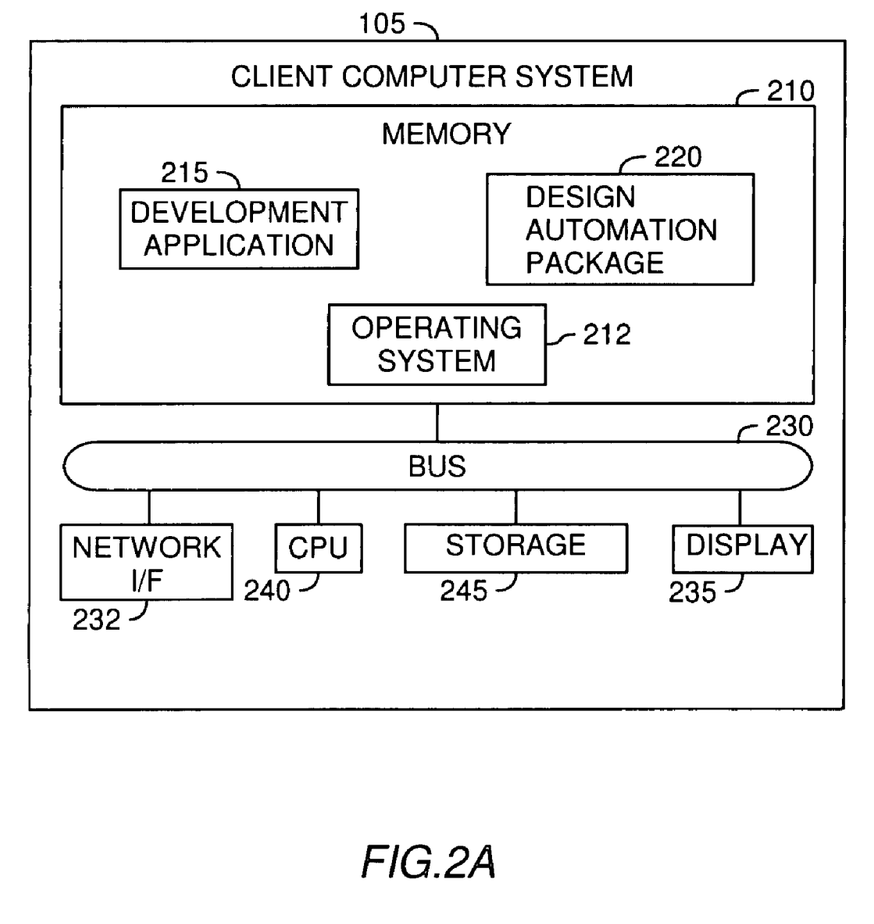
FIG. 2A illustrates a client computing system according to one embodiment of the invention.
Figure 2B:
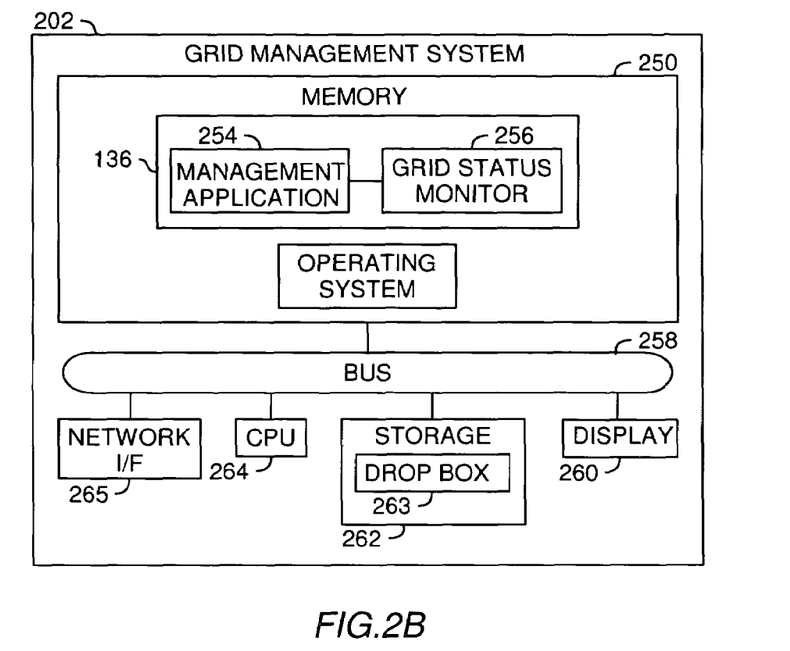
FIG. 2B illustrates a grid management system according to one embodiment of the invention.
Figure 2C:
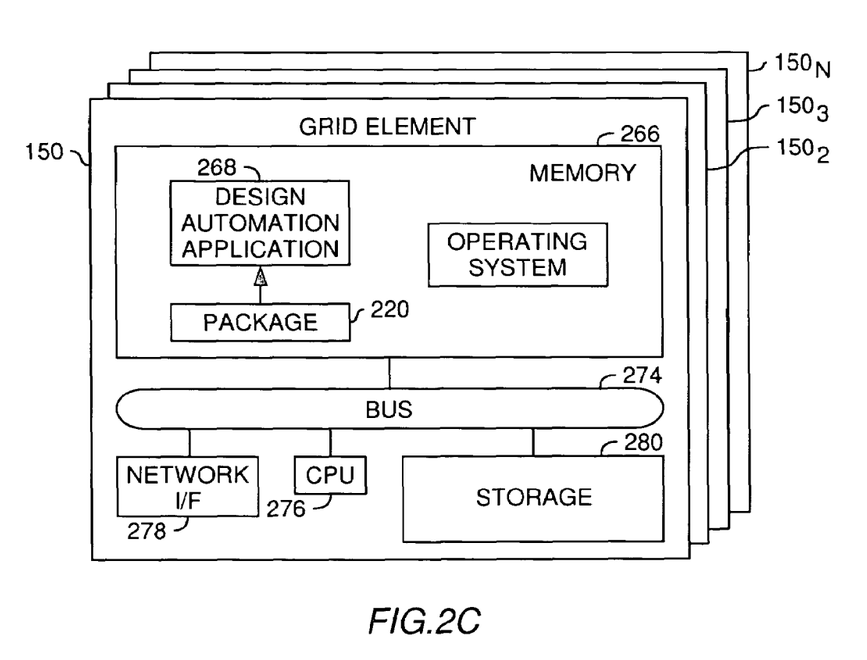
FIG. 2C illustrates a plurality of grid elements according to one embodiment of the invention.

FIGS. 2A-C further illustrate the exemplary computer systems shown in FIG. 1. FIG. 2A illustrates a client system 105, according to one embodiment of the invention. Client system 105 communicates across network 110 with grid management system 202 (illustrated in FIG. 2B), which in turn manages the resources of grid elements 150 (illustrated in FIG. 2C).

Client computer system 105 includes network interface 232 that allows client computer system 105 to communicate with the on-demand grid system 115. Client computer system 105 generally includes a central processing unit (CPU) 240 connected via a bus 230 to memory 210 and storage 245. Typical storage devices include IDE, SCSI, or RAID managed hard drives. Although shown as a single unit, it may comprise a combination of both fixed and removable storage devices, such as fixed disc drives, floppy disc drives, tape drives, removable memory cards, or optical storage. Additionally, network storage devices such as AFS, NFS, or GSA may be used. Memory may include memory storage devices that come in the form of chips (e.g., SDRAM or DDR memory modules).

Client system 105 runs an operating system 212, (e.g., a Linux® distribution, Microsoft Windows®, IBM's AIX®, FreeBSD, and the like) that manages the interaction between hardware components and higher-level software applications such as development application 215 used to construct a design automation package 220. Client system 105 may further include I/O devices such as a mouse, keyboard, and monitor, along with other specialized hardware.

In one embodiment, a user may compose a design automation package 220 using development application 215 shown residing in memory 210. The design automation package 220 may comprise a data component and a set of commands. For example, the data component may comprise data used for applications such as high-level synthesis, logic synthesis, static timing analysis, placement, physical synthesis, or wiring, and the like. Such data may include the netlist information that describes a particular electronic or integrated circuit. As those skilled in the art will understand, a netlist is a description of an electronic circuit on a system consisting of all of the circuit element names/reference designators, listed with their input and output signal names. Netlists are the primary description of a circuit used for design automation applications. Example formats for netlists include industry standard formats, including EDIF (Electronic Design Interchange Format), Verilog, DEF and PDEF.

Design automation package 220 may also include a set of commands, typically expressed as a script. A user defines the command script according to a particular e-business offering offered by the grid provider (i.e., design automation application 268). The command script allows a client to control and direct the activity of application 268 analyzing or operating upon an electronic circuit design as represented using netlist data. For example information communicated by this mechanism may include performance expectations such as the "cycle time" or the speed at which a circuit is expected to perform. Together, a processing request (or design automation task) comprises the collection of data and set of commands to test, inspect, or otherwise operate upon the data. The commands available to construct a script are defined by the service provider. In one embodiment, the commands available to construct a command script are limited to commands associated with design automation tasks.

After composing a design automation package 220, a user may deliver it to grid system 115 for processing. The package is received by grid management system 202. FIG. 2B illustrates an embodiment of grid management system 202. The grid manager 136 oversees the activity and status of grid elements 150 along with managing communication with client systems 105 regarding the processing tasks. In one embodiment, network interface 265 connects grid management system 202 to a local area network that includes the grid elements 150. Such a network may not be generally accessible outside the on-demand environment and grid system 115, except through the gateway and firewall interface illustrated in FIG. 1.

Grid management system 202 is connected to network 110 using network interface 265. The grid management system 202 includes bus 258 connecting CPU 264, display 260, storage 262, network interface 265, and memory 250. As illustrated in FIG. 2B, the memory 250 contains the grid management application 254 and grid status monitor 256, along with an operating system. Together, grid management application 254 and grid status monitor 256 maintain the grid system 115, assign resources to processing requests, dispatch processing requests to the grid for execution, and process results or any exceptions that occur during processing. For example, new processing requests may be placed in drop box 263. The management application 254 may be configured to periodically poll the drop box 263 to identify newly submitted processing requests. Once a new request is submitted, (e.g., by client 105 communicating with HTTP server 130 to deliver package 220 to drop box 263), the management application 254 may assign grid elements to carry out the request.

FIG. 2C illustrates an embodiment of grid element 150 that may be available as a resource in computing grid 145 to perform computing tasks under the direction of grid management system 202. It being understood, however, that computing grid 145 may comprise an arbitrary number of grid elements 150 that may be configured, more or less, like the one illustrated in FIG. 2C. Accordingly, FIG. 2C illustrates additional grid elements $150_{2-N}$. Further, the resources assigned by the management application 254 to a processing request may extend beyond the single system illustrated by grid element 150, and grid element 150 may itself comprise a cluster of computing resources configured to appear as a single entity, such as a Beowulf cluster. Thus, multiple computer systems (or grid elements 150) may be assigned to a particular processing request. For example, resource availability, resource requirements, parallelizability, and contractual constraints may all affect what resources are assigned to a processing request.

As illustrated in FIG. 2C, the exemplary grid element 150 comprises a computer system that includes a bus 274 used to operatively connect CPU 276, network interface 278, storage 280 and memory 266. Grid element 150 is executing a processing request (e.g., design automation package 220) submitted by a client 105, and assigned to grid element 150 by grid management application 254. The package may be stored in drop box 263 until it is assigned for processing to the grid system 115. Once the grid elements 150 complete processing a design automation task stored in package 220, result data may be transmitted to drop box 263. Grid status monitor 256 may be configured to observe grid activity and account for resources consumed (e.g., for fee accounting) and for any changes to a grid element 150 (e.g., any failed portions of the computing grid 145).

In one embodiment, the design automation application 268 may comprise a command interpreter process running on grid element(s) 150 that interprets a script composed according to a scripting language. In a particular embodiment, the command script is composed using the Tcl language, and the design automation application may comprise a Tcl command interpreter. As those skilled in the art understand, Tcl is an interpreted computer language designed for design automation tool extension and control as well as other general computer tasks such as file manipulation that offers a high degree of flexibility. While Tcl is the predominant scripting and control language for Design Automation tools, Perl, and other scripting languages may be used.

The Tcl command interpreter provided to execute package 220 may be both extended and limited. Specifically, in one embodiment, the Tcl command interpreter may be extended by adding custom libraries, commands and routines that a user may include in a command script. The command interpreter may be limited by disabling scripting commands that would allow the command script included in one processing request to eavesdrop or interfere with others. In one aspect, prohibiting the use of certain scripting commands is a general assertion about which commands a thorough design automation application may require to evaluate a particular circuit design.

Further, spawning a modified command interpreter for each processing request creates a protected environment that allows the grid system 115 to process multiple packages 220 simultaneously. The modified interpreter acts as a secure container to execute the command script inside the design automation application 268. Within this environment, the child interpreter consumes grid resources, as needed and available, to complete the processing request. Accordingly, the grid resources being used may vary over the course of executing a particular design automation task.

Figure 3A:
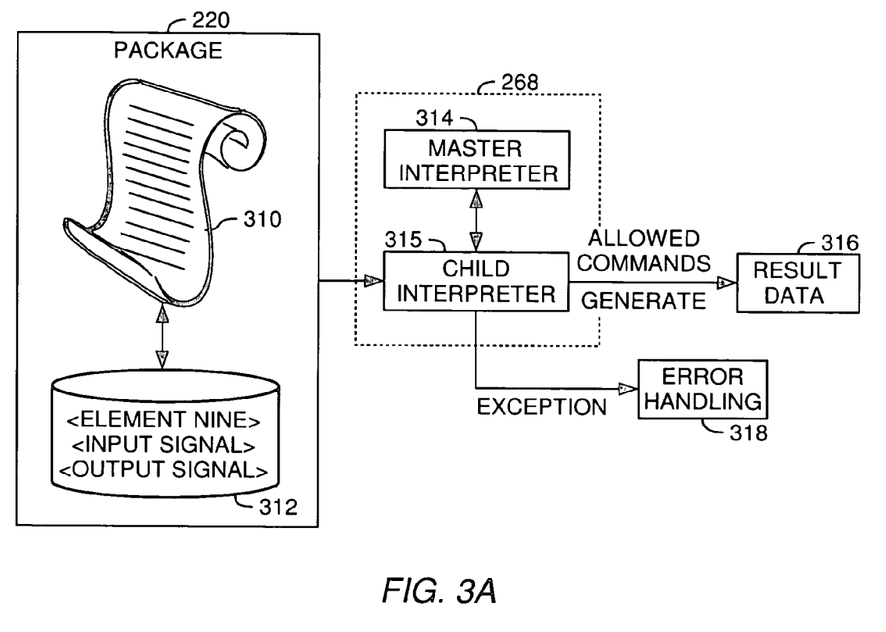
FIG. 3A illustrates a view of a processing request and a design automation application according to one embodiment of the invention.

FIG. 3A illustrates a view of design automation package 220 and design automation application 268. As described above, the design automation package 220 includes a command script 310 and design automation data 312. In one embodiment, command script 310 comprises a Tcl script composed using the commands and control mechanisms provided by child interpreter 315. Design automation data 312 may include a netlist describing an electronic circuit to be tested. During script evaluation, the child interpreter 315 evaluates the script as defined by the script language's semantics and carries out the commands contained therein. As this occurs, the design automation application 268 may record results data 316. If a command script 310: (i) includes commands that are unauthorized, (ii) is written incorrectly, or (iii) if data values exceed an allowable range, error handling routines 318 may terminate a particular processing request before it is completed, freeing grid resources to execute other design automation tasks. For example, if a command script 310 attempts to access a command that has not been exposed to the secure environment, then the processing request may be terminated and an exception event reported to the grid provider and the requesting client.

Figure 3B:
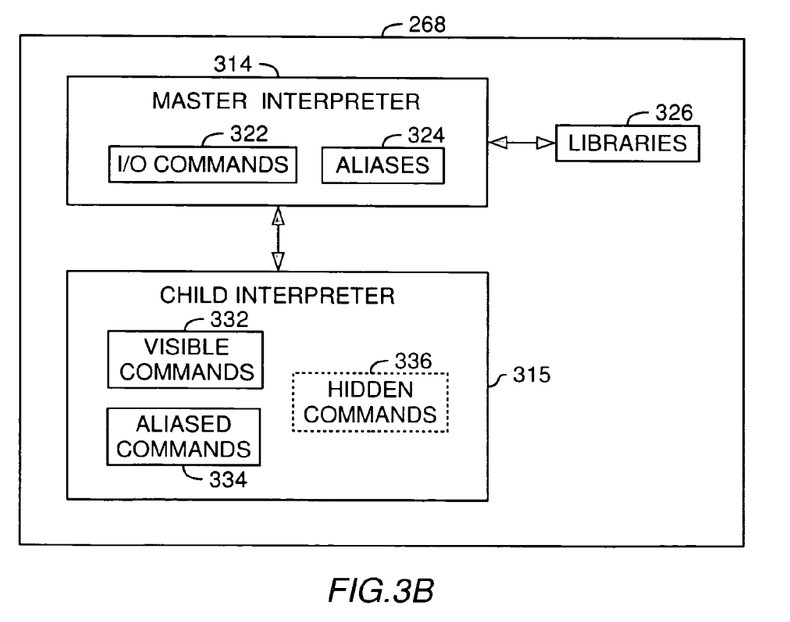
FIG. 3B illustrates a view of the design automation application according to one embodiment of the invention.

FIG. 3B illustrates a design automation application 268 according to one embodiment of the invention. The design automation application 268 is crafted so that command scripts from the client (e.g., script 310) cannot be used to execute malicious code or gather unauthorized information. As illustrated, the design automation application 268 includes a master command interpreter 314, libraries 326, and a child interpreter 315. The master command interpreter 314 includes the full set of commands that may be used by the grid provider to compose a script 310 (e.g., a Tcl script) that embodies the full design automation task. For example, the master command interpreter 314 may include I/O (input/output) commands 322 used to write or read from an arbitrary memory location (e.g., memory 268) or access network resources (e.g., across network interface 278). Rather than provide direct access to these commands, the master command interpreter 314 may provide a set of aliased commands 324 that provide some (but not all) of the functionality of the underlying actual command.

Aliased commands allow a user to invoke a "safe" version of an otherwise, prohibited command. For example, an aliased command may allow a command script to write to files created by the command script to store results data, but prohibit the script from writing to system files.

In addition, the command set understood by the master command interpreter 314 may be extended by the use of libraries 326. As those skilled in the art understand, a library is a collection of subroutines used to develop a software application. Libraries differ from executable programs in that they are not independent programs; rather, they are "helper" code that provides services to some other independent program.

In one embodiment, the child interpreter 315, may comprise a subset of the commands available to the master command interpreter 314. As illustrated, the child interpreter 314 includes visible commands 322 that are available for an individual client to compose a command script 310. Aliased commands 334 provide an alternate version of a particular command so that users may still execute an otherwise prohibited command in an acceptable fashion. Hidden commands 336 are commands unavailable for a client to include in command script 310. For example, the child interpreter provided with a particular design automation application 268 may prohibit client scripts from invoking any system or shell commands, performing file input or output directly, accessing network services, and other commands unnecessary to perform design automation tasks. At the same time, the child interpreter 315 may be configured to request resources from the grid manager 136, or request the command interpreter to carry out actions that it cannot carry out directly.

In an active computing grid, multiple child interpreters may be invoked to process different design automation tasks provided by different, even competing entities. Each child interpreter has access, or can request and acquire, the resources to complete a design automation task, while also prohibiting the design automation task from engaging in unwanted behavior.

Using the definition of a design automation application 268 as described herein, users may construct a command script to process a design automation task in a computing grid. In one embodiment, the grid provider makes the definition of the child interpreter available to an interested party. The description may include all the functions (e.g., command inputs and outputs) available to compose a command script 310. Together, the design automation application 268 is constructed to use package 220 that includes command script 310 and client data 312 as input for processing. The design automation application 314 executes securely using grid resources dynamically assigned to it by the management application 254. Each invocation of the design automation application 268 is processed on the grid system independently of others.

Figure 4:
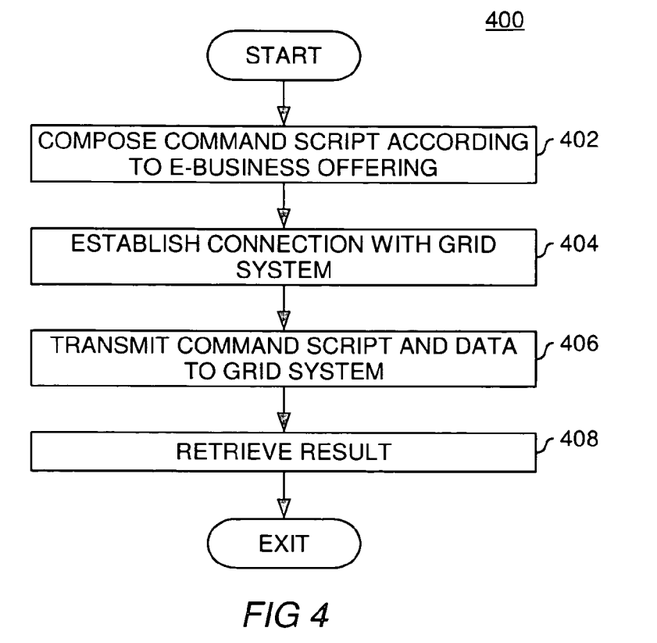
FIG. 4 illustrates a method for processing a design automation task according to one embodiment of the invention.

FIG. 4 illustrates a method 400 for extending a design automation task for execution by a grid system, according to one embodiment of the invention. The method 400 begins at step 402 where a client, (e.g., using development application 215 illustrated in FIG. 2) composes a command script to specify configuration information, such as a timing performance specification, of an electronic circuit (e.g., represented by a netlist). The user composes the command script according to the definition of a design automation application available on the grid system. After completing a particular command script 310, the client establishes a connection with the grid system 115 at step 404. For example, the client system 105 may interact with the grid manager 136 using a web-based interface and a common web-browser. In one embodiment, the client system 105 may be required to authenticate itself to the grid system 115.

Figure 5:
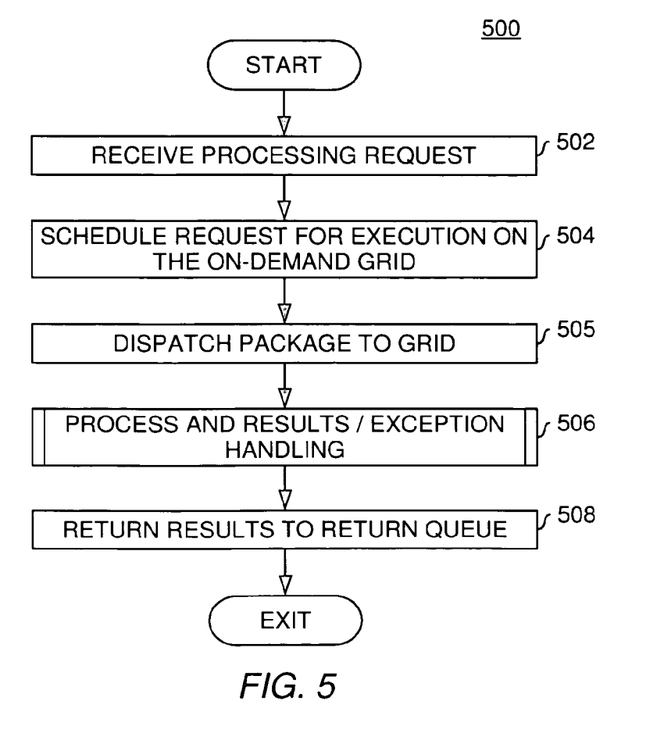
FIG. 5 illustrates a method for composing a design automation task for execution by a grid system according to one embodiment of the invention.

At step 406, after a connection is established, a package that includes both the netlist, the command script, and any other client data is transmitted to the grid manager 136. Once transmitted, the client waits for a result from the grid system 115. In one embodiment, the client system may be notified of a result using E-mail. Alternatively, a user of the client system my periodically establish a connection with the grid system to determine whether any results are available to retrieve form a drop box server. However notified, the client 105 retrieves result data from the grid system at step 408, if not included in the result notification FIG. 5 illustrates a method 500 for processing a processing request (e.g., design automation package 220), according to one embodiment of the invention. The method 500 begins after a user composes the configuration of a design automation task (e.g., a user may carry out the operations illustrated in FIG. 4) and provides it to the grid system 115. Accordingly, the grid system receives the design automation package 220 (also referred to as a "task") at step 502. In one embodiment, the design automation task may be stored using drop box server 140 in the grid system 115. At step 504, the management application 254 schedules the package 220 to execute on the computing grid 145. Any appropriate scheduling criteria may be used. For example, some packages may indicate a certain minimum amount of resources (or particular resource type) required for execution. Accordingly, such a package is dispatched for execution only when the requirements are available.

At step 505 the package is dispatched to the grid system 115 for execution and processed at step 506. In one embodiment, this may comprise invoking a design automation application 268 that includes a Tcl child interpreter and providing the command script included with the package as input data to the child interpreter. The child interpreter executes each command included in the command script. While the design automation application processes the command script 310, resources used by the design automation application 268 are monitored. For example, grid status monitor 256 may assign additional resources to the executing task. Alternatively, or in addition, the design automation application 268 may be configured to request (or to consume, so long as available) additional computing resources (e.g., grid elements 150) while processing command script 310.

At step 508, after the design automation application has completed processing the command script (or possibly after an exception has occurred), the management application 254 stores results data in a return queue (e.g., the drop box server 140). Alternatively, the management application 254 may transmit the results to client 105 using an appropriate communications channel.

Figure 6:
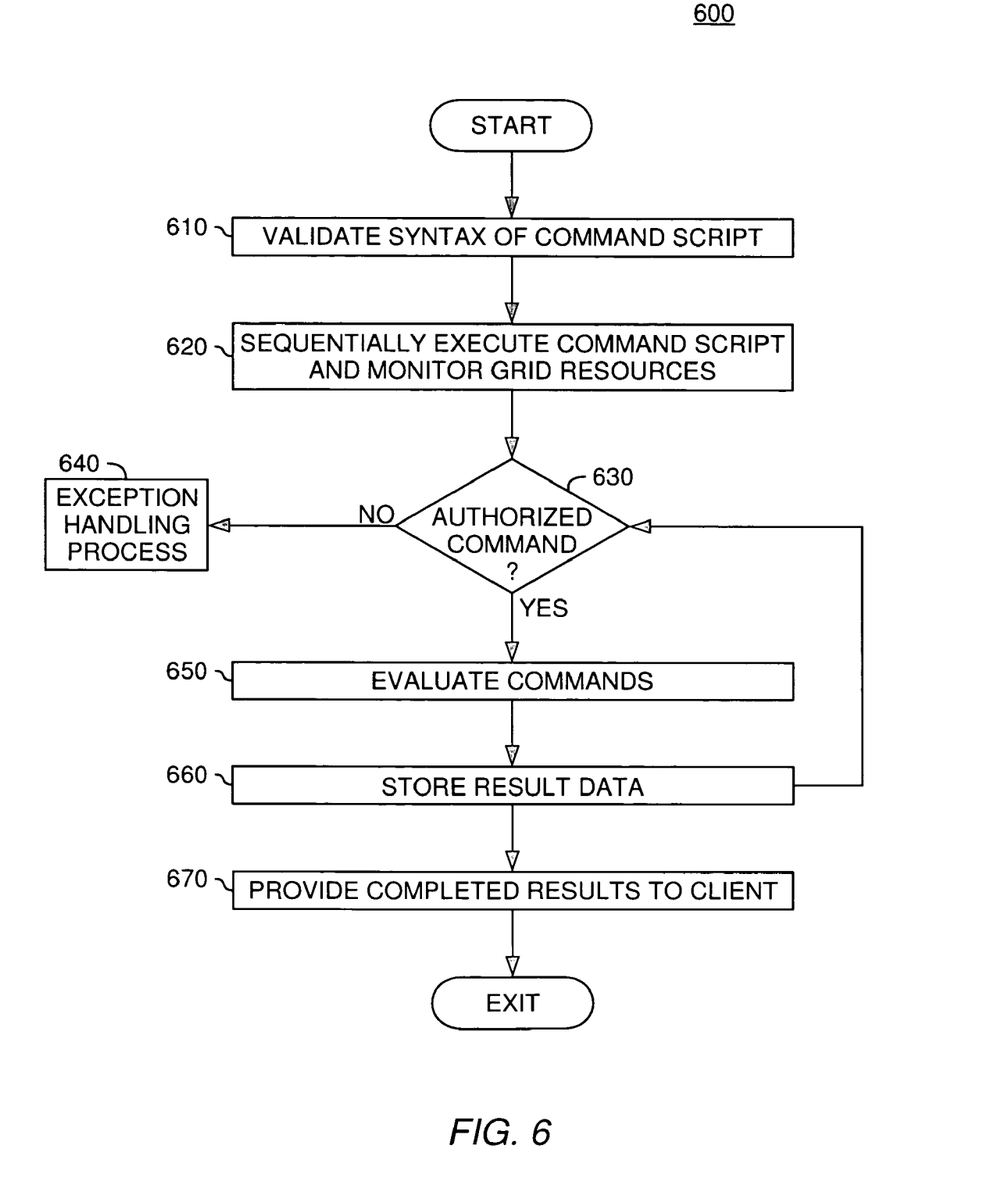
FIG. 6 illustrates a method for a grid system to process a design automation task according to one embodiment of the invention.

FIG. 6 illustrates a method 600 for a design automation application 268 to process a design automation package 220, in the on-demand grid system 115, (e.g., during step 506 illustrated in FIG. 5). The method begins at step 610 after the grid manger 136 has dispatched the design automation package 220 to the grid system 115 for processing and invoked an instance of design automation application 268 to process the design automation package 220. At step 610, the command script 310 included in the package 220 may be evaluated to verify that it is syntactically complete. In one embodiment, the script may be composed using a Tcl command script composed according to the definition for the design automation application as described above. At step 610, if the command script included in the task is incomplete (or poorly formed), then evaluation of the script may terminate without further processing.

Next, at step 620, sequential evaluation of the commands included in the command script begins. As those skilled in the art understand, the sequential evaluation of a command script 310 (e.g., a script written in Tcl) may include a series of branching, conditional and looping commands, as well as jumps to and from subroutines. In one embodiment, a grid status monitor 256 may be configured to observe what grid resources are being consumed by a processing task at any given time, and add or remove resources to a particular processing task as needed. Alternatively, or additionally, the design automation application 268 may be configured to consume additional grid resources as available to complete the processing request.

At step 630, the next command is selected for execution following the language semantics. If the command is an authorized command for invocation by the child interpreter, then the command is executed at step 650. If not, exception handling occurs at step 640. For example, the design automation application 236 may cease evaluating the command script 310. Alternatively, it may try to recover or continue without executing the prohibited command. As this occurs, any results data generated by the evaluation of the command script 310 may be stored at step 660. Steps, 630, 650 and 660 repeat until the script is completed (or terminated due to an exception at step 640). Once completed, results may be returned to the client 105 (e.g., in an email message) or stored in drop box server 140 for later retrieval (step 670).

Embodiments of the present invention allow a grid services provider to define a design automation application to evaluate (execute) command scripts provided by different clients. In a particular embodiment, the design automation application is constructed by defining Tcl child interpreters to prohibit access to commands that could be used to comprise the security of the grid system. Doing so allows different invocations of the design automation application to execute concurrently in the grid system without the requirements of system partitioning or resource scrubbing. Thus, the efficiency of the grid system is maximized while also increasing the overall security of the grid system.

While the foregoing is directed to embodiments of the present invention, other and further embodiments of the invention may be devised without departing from the basic scope thereof, and the scope thereof is determined by the claims that follow.

What is claimed is:

1. A computer implemented method for providing access to a computing grid, comprising:
   providing a design automation application, wherein the design automation application is configured to process a design automation task, wherein the design automation task comprises (i) a sequence of commands to be evaluated by a command interpreter of the design automation application, wherein the command interpreter comprises both a Tcl command interpreter and a Tcl child interpreter, wherein the Tcl child interpreter is configured to prevent the design automation task from at least one of invoking any system or shell commands, performing file input or output, accessing network services, and from invoking other commands unnecessary for processing the design automation task and (ii) a set of data representing an electronic circuit, wherein the sequence of commands is executed by the Tcl child interpreter;
   providing an interface for a user of a computer system to transmit the design automation task to the computing grid;
   receiving, from a requesting entity, the design automation task and a request to process the design automation task;
   invoking an instance of the design automation application on the computing grid;
   providing the design automation task to the instance of the design automation application;
   evaluating, using the Tcl command interpreter and the Tcl child interpreter, the set of commands included in the design automation task, wherein the Tcl child interpreter prevents the design automation task from invoking at least a first command included in the sequence of commands unnecessary for processing the design automation task; and
   returning results of the evaluation to the requesting entity.

2. The method of claim 1, wherein the computing grid comprises a set of computer systems connected together to form a network, and wherein the set of computer systems is managed by a grid management computer.

3. The method of claim 1, wherein the design automation task comprises one of a high-level synthesis, a logic synthesis, a static timing analysis, a placement, a physical synthesis and a wiring task.

4. The method of claim 1, wherein providing the interface comprises providing a web-based interface configured to allow the user to transmit the design automation task to the computing grid over a computer network.

5. The method of claim 1, wherein the grid management computer is configured to return an indication of evaluation results by generating an email message to be sent to an email address associated with the requesting entity.

6. The method of claim 1, further comprising:
   monitoring the grid activity and resources consumed by the instance of the design automation application that occur while the instance of the design automation application evaluates the set of commands included in the design automation task and calculating a fee charged to the requesting entity for processing the design automation task.

7. A system for evaluating a design automation task, comprising:
   a computing grid comprising a plurality of computer resources connected together to form a network of resources;
   an application configured to process the design automation task, using the network of resources, wherein the design automation task comprises (i) a set of commands to be processed by the design automation application, wherein the command interpreter comprises both a Tcl command interpreter and a Tcl child interpreter, wherein the Tcl child interpreter is configured to prevent the design automation task from at least one of invoking a system or shell a command, performing file input or output, accessing network services, and from invoking other commands unnecessary for processing the design automation task and (ii) a set of data representing an electronic circuit, wherein the sequence of commands is executed by the Tcl child interpreter;
   an interface for a user of the computing grid to transmit the design automation task to the computing grid; and
   a grid management application configured to:
      receive, from a requesting entity, the design automation task and a request to process the design automation task,
      invoke an instance of the design automation application on the computing grid,
      provide the design automation task to the instance of the design automation application,
      evaluate, using the TCL command interpreter and the Tcl child interpreter, the set of commands included in the design automation task, wherein the Tcl child interpreter prevents the design automation task from invoking at least a first command included in the sequence of commands unnecessary for processing the design automation task, and return results of the evaluation to the requesting entity.

8. The system of claim 7, wherein the design automation task comprises one of a high-level synthesis, a logic synthesis, a static timing analysis, a placement, a physical synthesis and a wiring task.

9. A computer readable storage medium containing a program which, when executed on a processor, performs an operation, the operation comprising:
   defining a design automation application, wherein the design automation application is configured to process a design automation task, wherein the design automation task comprises (i) a sequence of commands to be executed by a command interpreter of the design automation application, wherein the command interpreter comprises both a Tcl command interpreter and a Tcl child interpreter, wherein the Tcl child interpreter is configured to prevent the design automation task from at least one of invoking any system or shell commands, performing file input or output, accessing network services, and from invoking other commands unnecessary for processing the design automation task and (ii) a set of data representing an electronic circuit, wherein the sequence of commands is executed by the Tcl child interpreter; and providing an interface for a requesting entity to transmit, to a grid management application, the design automation package and a request that that the computing grid process the design automation task, wherein the grid management application is configured to;

invoke an instance of the design automation application on the computing grid;

provide the design automation package to the instance of the design automation application;

evaluate, using the Tcl command interpreter and the Tcl child interpreter, the set of commands included in the design automation task, wherein the Tcl child interpreter prevents the design automation task from invoking at least a first command included in the sequence of commands unnecessary for processing the design automation task; and return results of the evaluation to the requesting entity.

10. The computer readable storage medium of claim 9, wherein the computing grid comprises a set of computer systems connected together to form a network, and wherein the set of computer systems is managed by the grid management application.

11. The computer readable storage medium of claim 9, wherein the design automation task comprises one of a high-level synthesis, a logic synthesis, a static timing analysis, a placement, a physical synthesis and a wiring task.

* * * * *